United States Patent Office 3,492,351
Patented Jan. 27, 1970

3,492,351
1-(LOWER ALKOXY-PHENYL)-2-(LOWER ALKYL-AMINO)-ALKANONES-(1) AND SALTS
Herbert Koppe, Ingelheim am Rhein, Gerhard Ludwig, Wedel, Holstein, and Karl Zeile, Ingelheim am Rhein, Germany, assignors to Boehringer Ingelheim G.m.b.H., Ingelheim am Rhein, Germany, a corporation of Germany
No Drawing. Continuation-in-part of application Ser. No. 444,038, Mar. 30, 1965. This application Mar. 7, 1968, Ser. No. 711,167
Claims priority, application Germany, Apr. 8, 1964, B 76,240
Int. Cl. C07c 95/08, 49/76; A61k 27/00
U.S. Cl. 260—570.5                                     5 Claims

ABSTRACT OF THE DISCLOSURE

1 - (lower alkoxy-phenyl) - 2 - (lower alkyl-amino)-alkanones-(1) and acid addition salts thereof, useful as central nervous system stimulants in warm-blooded animals.

---

This is a continuation-in-part of copending application Ser. No. 444,038, filed Mar. 30, 1965 and now abandoned.

This invention relates to novel α-amino-substituted (lower alkoxy-phenyl)-alkanones and acid addition salts thereof, as well as to various methods of preparing these compounds.

More particularly, the present invention relates to racemic mixtures of compounds of the formula

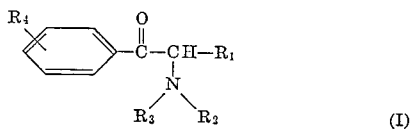

wherein $R_1$ is straight-chain alkyl of 2 to 6 carbon atoms,
$R_2$ is hydrogen or straight- or branched-chain lower alkyl,
$R_3$ is straight- or branched-chain lower alkyl, and
$R_4$ is lower alkoxy, an optically active antipode component thereof, or nontoxic, pharmacologically acceptable acid addition salts of said racemic mixture or of said optically active antipode.

The free base compounds according to the present invention, that is, those embraced by Formula I above, may be prepared by a variety of methods involving well known chemical principles, among which the following have been found to be most convenient and efficient:

METHOD A (1) By reacting an α-halo-substituted (lower alkoxy-phenyl)-alkanone of the formula

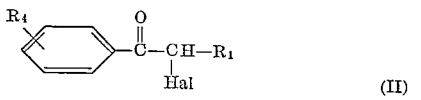

wherein $R_1$ and $R_4$ have the same meanings as in Formula I and Hal is a halogen, with a primary or secondary amine of the formula

wherein $R_2$ and $R_3$ have the same meanings as in Formula I.

The reaction is preferably carried out in the presence of an inert organic solvent, such as benzene or ethanol, and at a temperature below 100° C. It is preferred to provide a substantial excess of the amine III over and above the stoichiometric amount required for reaction with compound II in order to tie up or neutralize the hydrogen halide released by the reaction. However, an inorganic base or another organic base may be added to the reaction mixture for the same purpose.

The reaction mixture may be worked up in customary fashion; for instance, by dissolving the reaction product in ether and precipitating it from solution as hydrohalide addition salt.

(2) An alternative variation of the method described in (1) above is the reaction of an α-halo-alkanone of the Formula II with the potassium salt of a phenyl-sulfonic acid alkylamide, preferably with the potassium salt of a toluenesulfonic acid alkylamide of the formula

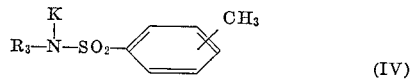

wherein $R_3$ has the same meanings as in Formula I, accompanied by release of potassium halide. The intermediate product is then transformed into a compound of the Formula I with the aid of an acid, especially by several hours' boiling with concentrated hydrochloric acid accompanied by release of toluenesulfonic acid.

(3) A further alternative variation of the process described in (1) above comprises reacting a haloalkanone of the Formula II with an alkali metal alcoholate to form as an intermediate product an epoxyether of the formula

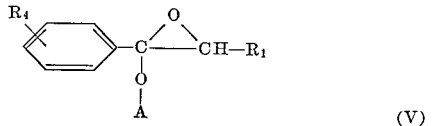

wherein $R_1$ and $R_4$ have the same meanings as in Formula I and A is lower alkyl, and subsequently reacting the intermediate product with a primary or secondary amine of the Formula III. The reaction mixture is then worked up as described in (1).

METHOD B

By alkylating a 1 - (lower alkoxy-phenyl)-2-amino-alkanone-(1) of the formula

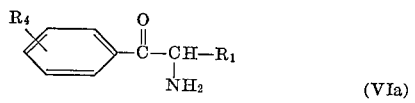

or

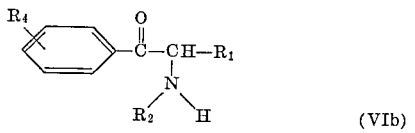

wherein $R_1$, $R_2$ and $R_4$ have the same meanings as in Formula I, with an alkylating agent of the formula

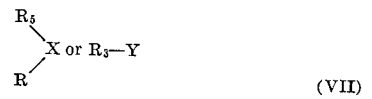

wherein $R_3$ has the same meanings as in Formula I, $R_5$ is lower alkyl, Y is halogen, benzene-sulfonyl, toluene-sulfonyl or the like, and X is sulfate or the like. The alkylating reaction is preferably carried out in the presence of a compound capable of tying up or neutralizing the acid released by the reaction, such as an alkali metal or an alkali metal alcoholate, and advantageously in aqueous suspension or in the presence of an inert organic solvent. The amino group may also be methylated with a mixture of formaldehyde and formic acid.

METHOD C

By converting the tertiary amino group of a 1-(lower alkoxy-phenyl)-2-amino-alkanone-(1) of the formula

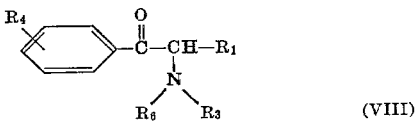 (VIII)

wherein $R_1$, $R_3$ and $R_4$ have the same meanings as in Formula I and $R_6$ is a substituent which can be readily split off, into a secondary amino group ($-NH-R_3$). Examples of substituents which may readily be split off include acyl and aralkyl substituents, especially carbobenzoxy and benzyl. In the event that $R_6$ is aralkyl, such as benzyl, the conversion of $R_6$ into hydrogen may, for example, be effected by selective hydrogenation with palladium chloride/animal charcoal in the presence of ethanol. If $R_6$ is acyl, such as carbobenzoxy, its removal may be effected in conventional fashion, such as by hydrogenation or hydrolysis, provided the conditions are sufficiently mild.

METHOD D

By oxidizing a (lower alkoxy-phenyl)-α-aminoalkanol of the formula

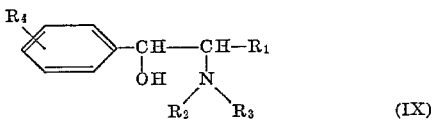 (IX)

wherein $R_1$, $R_2$, $R_3$ and $R_4$ have the same meanings as in Formula I, with an oxidizing agent, such as chromic acid or an alkali metal dichromate. The oxidation reaction, which proceeds readily at room temperature or slightly elevated temperatures, may be performed in the presence of an aqueous solvent at an acid pH.

METHOD E

By reacting a compound of the formula

 (X)

wherein Z is an unsubstituted or substituted carboxamide group or cyano and $R_1$ and $R_3$ have the same meanings as in Formula I, and $R_7$ is lower alkyl, with a compound of the formula

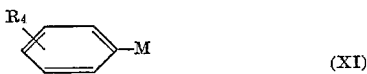 (XI)

wherein $R_4$ has the same meanings as in Formula I and M is an alkali metal or —MgHal, where Hal is halogen, under anhydrous conditions, and subsequently hydrolyzing the reaction product.

The reaction between compounds X and XI in an anhydrous medium is carried out under customary conditions, namely, in anhydrous ether or an anhydrous mixture of tetrahydrofuran and benzene at the boiling point of the solvent.

If Z in Formula X is cyano, the reaction proceeds best in a mixture of benzene and tetrahydrofuran under reflux, i.e. at about 60° C.

METHOD F

By reacting an α-amino-cyanoalkane of the formula

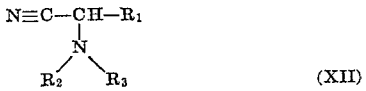 (XII)

wherein $R_1$, $R_2$ and $R_3$ have the same meanings as in Formula I, with a benzene compound of the formula

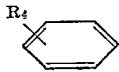 (XIII)

wherein $R_4$ has the same meaning as in Formula I, in the presence of a Friedel-Crafts catalyst, such as aluminum chloride, and subsequently hydrolyzing the ketimine reaction product.

The reaction between compounds XII and XIII may be carried out in the presence of a solvent customarily used for this type of reaction, such as nitrobenzene; when aluminum chloride is used as the catalyst, it proceeds smoothly at slightly elevated temperatures while introducing hydrogenchloride into the reaction mixture for several hours.

The compounds according to the present invention have optically active centers and therefore occur as racemic mixtures which may be divided into the respective optically active antipode components in customary fashion, such as by fractional crystallization of their diastereomeric salts with dibenzoyl-d-tartaric acid.

The compounds embraced by Formula I are organic bases and may, if desired, be converted into their non-toxic, pharmacologically acceptable acid addition salts by conventional methods, such as by dissolving the free base in a suitable solvent and acidifying the solution with the desired inorganic or organic acid. Examples of inorganic and organic acids which will form non-toxic, pharmacologically acceptable acid addition salts with the basic compounds of the Formula I above are hydrochloric acid, sulfuric acid, acetic acid, tartaric acid, maleic acid, sulfaminic acid, 8-chlorotheophylline and the like.

The following examples further illustrate the present invention and will enable others skilled in the art to understand it more completely. It should be understood, however, that the invention is not limited solely to the particular examples given below.

Example 1

Preparation of 1 - (p - methoxyphenyl)-2-ethylamino-butanone-(1) and its hydrochloride by Method A.—31 gm. (0.12 mol) of 1-(p-methoxy-phenyl)-2-bromo-butanone-(1) were dissolved in 100 cc. of absolute benzene, and the resulting solution was cooled to 5° C. Thereafter, 18 gm. (0.4 mol) of ethylamine were added to the solution, and the mixture was allowed to stand overnight at room temperature. Subsequently, the reaction mixture was refluxed on a water bath for three hours, allowed to cool, admixed with ether, and washed with water. The organic phase was dried over magnesium sulfate, evaporated, and the residue, 1-(p-methoxyphenyl)-2-ethylamino-butanone-(1), was dissolved in ether. The resulting solution was acidified with ethereal hydrochloric acid, and the precipitate formed thereby was collected and recrystallized from ethanol. 19.5 gm. (63% of theory) of a compound having a melting point of 223–224° C. were obtained, which was identified to be the hydrochloride of 1-(p-methoxy-phenyl)-2-ethylamino-butanone-(1) of the formula

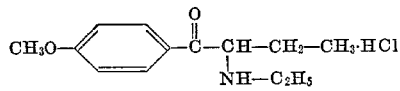

Example 2

Using a procedure analogous to that described in Example 1, 1-(o-methoxy-phenyl)-2-methylamino-butanone-(1) of the formula

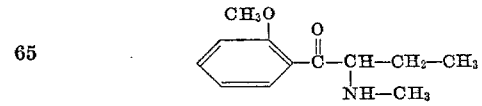

was prepared from 1-(o-methoxy-phenyl)-2-bromo-butanone-(1) and methylamine. Its hydrochloride had a melting point of 160–163° C.

Example 3

Using a procedure analogous to that described in Example 1, 1-(o-methoxy-phenyl)-2-ethylamino-butanone-(1) was prepared from 1-(o-methoxy-phenyl)-2-bromobutanone-(1) and ethylamine. Its hydrochloride had a melting point of 172–174° C.

Example 4

Using a procedure analogous to that described in Example 1, 1-(-omethoxy-phenyl) - 2 - isopropylamino-butanone-(1) was prepared from 1-(o-methoxy-phenyl)-2-bromo-butaneone-(1) and isopropylamine. Its hydrochloride had a melting point of 178–181° C.

Example 5

Using a procedure analogous to that described in Example 1, 1-(m-methoxy-phenyl) - 2 - methylamino-butanone-(1) of the formula

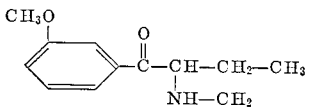

was prepared from 1-(m-methoxy-phenyl)-2-bromo-butanone-(1) and methylamine. Its hydrochloride had a melting point of 210–213° C.

Example 6

Using a procedure analogous to that described in Example 1, 1-(m-methoxy-phenyl)-2-ethylamino-butanone-(1) was prepared from 1-(m-methoxy-phenyl)-2-bromo-butanone-(1) and ethylamine. Its hydrochloride had a melting point of 237–240° C.

Example 7

Using a procedure analogous to that described in Example 1, 1-(m-methoxy-phenyl)-2-n-propylamino-butanone-(1) was prepared from 1-(m-methoxy-phenyl)-2-bromo-butanone-(1) and n-propylamine. Its hydrochloride had a melting point of 210–213° C.

Example 8

Using a procedure analogous to that described in Example 2, 1-(m-methoxy-phenyl)-2-isopropylamino-butanone-(1) was prepared from 1-(m-methoxy-phenyl)-2-bromo-butanone-(1) and isopropylamino. Its hydrochloride had a melting point of 225–230° C.

Example 9

Using a procedure analogous to that described in Example 1, 1-(p-methoxy-phenyl)-2-methylamino-butanone-(1) was prepared from 1-(p-methoxy-phenyl)-2-bromo-butanone-(1) and methylamine. Its hydrochloride had a melting point of 215—217° C.

Example 10

Using a procedure analogous to that described in Example 1, 1 - (p-methoxy-phenyl)-2-n-propylamino-butanone-(1) was prepared from 1-(p-methoxy-phenyl)-2-bromo-butanone-(1) and n-propylamine. Its hydrochloride had a melting point of 187–189° C.

Example 11

Using a procedure analogous to that described in Example 1, 1 - (p-methoxy-phenyl)-2-isopropylamino-butanone-(1) was prepared from 1-(p-methoxy-phenyl)-2-bromo-butanone-(1) and isopropylamine. Its hydrochloride had a melting point of 209–211° C.

Example 12

Using a procedure analogous to that described in Example 1, 1-(o-methoxy-phenyl)-2-isopropylamino-pentanone-(1) of the formula

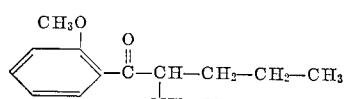

was prepared from 1-(o-methoxy-phenyl)-2-bromo-pentanone-(1) and isopropylamine. Its hydrochloride had a melting point of 178–179° C.

Example 13

Using a procedure analogous to that described in Example 1, 1 - (m-methoxy-phenyl)-2-methylamino-pentanone-(1) was prepared from 1-(m-methoxy-phenyl)-2-bromo-pentanone-(1) and methylamine. Its hydrochloride had a melting point of 190–195° C.

Example 14

Using a procedure analogous to that described in Example 1, 1-(m-methoxy-phenyl)-2-n-propylamino-pentanone-(1) was prepared from 1-(m-methoxy-phenyl)-2-bromo-pentanone-(1) and n-propylamine. Its hydrochloride had a melting point of 202–205.5° C.

Example 15

Using a procedure analogous to that described in Example 1, 1-(m-methoxy-phenyl)-2-isopropylamino-pentanone-(1) was prepared from 1-(m-methoxy-phenyl)-2-bromo-pentanone-(1) and isopropylamine. Its hydrochloride had a melting point of 205–206° C.

Example 16

Using a procedure analogous to that described in Example 1, 1 - (p-methoxy-phenyl)-2-methylamino-pentanone-(1) was prepared from 1-(p-methoxy-phenyl)-2-bromo-pentanone-(1) and methylamine. Its hydrochloride had a melting point of 201–205° C.

Example 17

Using a procedure analogous to that described in Example 1, 1-(p-methoxy-phenyl)-2-ethylamino-pentanone-(1) was prepared from 1-(p-methoxy-phenyl)-2-bromo-pentanone-(1) and ethylamine. Its hydrochloride had a melting point of 216–221° C.

Example 18

Using a procedure analogous to that described in Example 1, 1 - (p-methoxy-phenyl)-2-n-propylamino-pentanone-(1) was prepared from 1-(p-methoxy-phenyl)-2-bromo-pentanone-(1) and n-propylamine. Its hydrochloride had a melting point of 190.5 to 193.5° C.

Example 19

Using a procedure analogous to that described in Example 1, 1-(p-methoxy-phenyl)-2-isopropylamino-pentanone-(1) was prepared from 1-p-methoxy-penyl)-2-bromo-pentanone-(1) and isopropylamine. Its hydrochloride had a melting point of 217.5–221° C.

Example 20

Using a procedure analogous to that described in Example 1, 1-(p-methoxy-phenyl) - 2 - sec.butylamino-pentanone-(1) was prepared from 1-(p-methoxy-phenyl)-2-bromo-pentanone-(1) and sec.butylamine. Its hydrochloride had a melting point of 203–207° C.

Example 21

Using a procedure analogous to that described in Example 1, 1-(p-methoxy-phenyl)-2-dimethylamino-pentanone-(1) was prepared from 1-(p-methoxy-phenyl)-2-bromo-pentanone-(1) and dimethylamine. Its hydrochloride had a melting point of 187–191.5° C.

The compounds according to the present invention, that is, the racemates and optically active antipodes of those embraced by Formula I above as well as non-toxic acid addition salts of the racemates and optically active antipodes, have useful pharmacodynamic properties. More particularly, they exhibit very effective central nervous system stimulating activities in warm-blooded animals, such as mice.

The central nervous system stimulating activity and toxicity of the compounds according to the present invention were ascertained by means of the following standard pharmacological tests:

(1) *Central nervous system stimulating activity.*—Gradually increasing doses (5, 10, 15, 20, 25 and 30 mgm./kg.) of the compounds under investigation were administered subcutaneously in solution in distilled water to groups of five adult laboratory mice each, while the animals of a group of control animals received an equal volume of an aqueous 0.9% solution of sodium chloride by subcutaneous injection. Thereafter, the median effective does ($ED_{50}$), that is, the dose which produces nervous stimulation in 50% of the test animals, was determined by the method of Kärber, as described in Arch. Exp. Path. u. Pharmakol. 162, 480 (1931).

(2) *Toxicity.*—The toxicity of the compounds under investigation was determined in the same maner as the central nervous system stimulating activity, except that higher doses (100, 200, 300 and 400 mgm./kg.) of the compounds were administered to the animals by subcutaneous injection. The median lethal dose ($LD_{50}$) was determined by counting the number of animals which died within 24 hours after administration of each dose and calculating from the values thus obtained the dose which causes death in 50% of the animals, pursuant to Kärber (loc. cit.).

Finally, the therapeutic index (TI), that is, the ratio $LD_{50}/ED_{50}$ was calculated for each test compound.

The following table shows the results obtained:

| Compound | CNS-stimulating $ED_{50}$, mgm./kg. | $LD_{50}$, mgm./kg. | TI |
| --- | --- | --- | --- |
| 1-(p-Methoxyphenyl)-2-methyl-amino-butanone-(1) | 2.0 | 143 | 71.5 |
| 1-(p-Methoxyphenyl)-2-ethyl-amino-butanone-(1) | 1.45 | 253 | 170 |
| 1-(p-Methoxyphenyl)-2-n-propyl amino-butanone-(1) | 4.25 | 248 | 39.6 |
| 1-(p-Methoxyphenyl)-2-isopropyl-amino-butanone-(1) | 5.75 | 253 | 44 |

For pharmaceutical purposes the compounds according to the present invention are administered to warm-blooded animals orally or parenterally as active ingredients in conventional dosage unit compositions, that is, compositions in dosage unit form consisting essentially of an inert pharmaceutical carrier and one dosage unit of the active ingredient, such as tablets, coated pills, sustained release tablets, capsules and the like. One oral dosage unit of the compounds according to the present invention is from 0.0166 to 2.5 mgm./kg. body weight, preferably 0.083 to 1.25 mgm./kg. One parenteral dosage unit is from 0.005 to 0.84 mgm./kg., preferably 0.0166 to 0.34 mgm./kg.

The following examples illustrate a few dosage unit compositions comprising a compound of the invention as an active ingredient and represent the best mode contemplated of putting the invention to practical use. The parts are parts by weight, unless otherwise specified.

Example 22

*Tablets.*—The tablet composition was compounded from the following ingredients:

| | Parts |
| --- | --- |
| 1-(p-methoxy-phenyl)-2-methylamino butanone-(1)·HCl | 15.0 |
| Calcium phosphate | 150.0 |
| Lactose, pulverized | 83.0 |
| Corn starch | 180.0 |
| Colloidal silicic acid | 15.0 |
| Magnesium stearate | 2.0 |
| Gelatin | 5.0 |
| Total | 450.0 |

*Compounding procedure.*—The butanone compound, the lactose and a substantial portion of the corn starch and of the silicic acid were thoroughly admixed with each other, and the mixture was moistened with an aqueous 10% solution of the gelatin. The moist mass was forced through a 1.5 mm.-mesh screen, the moist granulate obtained thereby was dried for about twelve hours at 45° C., and the dry granulate was again passed through the screen. Thereafter, the granulate was thoroughly admixed with the remainder of the corn starch and of the silicic acid as well as with the magnesium stearate, and the resulting mixture was pressed into 450 mgm. tablets. Each tablet contained 35 mgm. of the butanone compound and, when administered perorally to a warm-blooded animal of about 60 kg. body weight in need of such treatment, produced very good CNS stimulating effects.

Example 23

*Sustained-release tablets.*—The tablet composition was compounded from the following ingredients:

| | Parts |
| --- | --- |
| 1-(p-methoxy-phenyl)-2-ethylamino-butaone-(1) hydrochloride | 3.0 |
| Hydrogenated castor oil | 22.0 |
| Lactose, pulverized | 8.0 |
| Corn starch | 8.0 |
| Talcum | 8.0 |
| Magnesium stearate | 1.0 |
| Total | 50.0 |

*Compounding procedure.*—The hydrogenated castor oil was heated to its melting point, the butanone compound was uniformly distributed therein, and the mixture was stirred until it had cooled to about room temperature. The solidified mass was then comminuted to a particle size of 1.5 mm., admixed with a filler granulate consisting of the lactose and the corn starch, and the mixture was uniformly admixed with the talcum and the magnesium stearate. The resulting composition was pressed into 50 mgm. tablets. Each tablet contained 3 mgm. of the pentanone compound and, when administered perorally to a warm-blooded animal of about 60 kg. body weight in need of such treatment, produced very good CNS stimulating effects.

Example 24

*Hypodermic solution.*—The solution was compounded from the following ingredients:

| | |
| --- | --- |
| 1-(p-methoxy-phenyl)-2-ethylamino-butanone-(1)·HCl, parts | 15.0 |
| Disodium salt of ETDA, parts | 1.0 |
| Double distilled water q.s.ad, parts by vol. | 1000.0 |

*Compounding procedure.*—The butanone compound and the EDTA salt were dissolved in the distilled water, the solution was filtered until free from suspended particles, and the filtrate was filled into 2-ml. ampules which were then sterilized and sealed. Each ampule contained 30 mgm. of the butanone compound, and when the contents thereof were administered intravenously to a warm-blooded animal of about 60 kg. body weight in need of such treatment, very good CNS stimulating effects were obtained.

Although the above dosage unit composition examples illustrate the use of only three specific compounds of the present invention as active ingredients, it should be understood that any of the other compounds embraced by Formula I or an optical antipode thereof, or a non-toxic acid addition salt of either of these may be substituted for the particular compounds illustrated in Examples 22 through 24. Moreover, the amount of active ingredient in the above illustrative dosage unit compositions may be varied within the dosage unit limits set forth above, and the amounts and nature of the inert carrier components may be varied to meet particular requirements.

We claim:
1. A racemic mixture of a compound of the formula

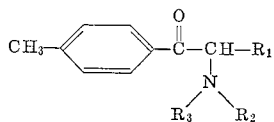

wherein
$R_1$ is straight-chain alkyl of 2 to 4 carbon atoms,
$R_2$ is alkyl of 1 to 4 carbon atoms, and
$R_3$ is hydrogen or methyl, an optically active antipode component thereof, or a non-toxic, pharmacologically acceptable acid addition salt of said racemic mixture or of said optically active antipode.

2. A compound according to claim 1, wherein $R_1$ and $R_2$ are ethyl, and $R_3$ is hydrogen.

3. A compound according to claim 1, wherein $R_1$ is ethyl, $R_2$ is methyl, and $R_3$ is hydrogen.

4. A compound according to claim 1, wherein $R_1$ and $R_2$ are ethyl, and $R_3$ is hydrogen.

5. A compound according to claim 1, wherein $R_1$ is ethyl, $R_2$ is isopropyl, and $R_3$ is hydrogen.

References Cited
UNITED STATES PATENTS

| | | | |
|---|---|---|---|
| 1,767,423 | 6/1930 | Adams | 260—570.6 |
| 2,155,194 | 4/1939 | Kamlet | 260—570.5 |
| 2,854,483 | 9/1958 | Langis et al. | 260—570.6 |
| 3,082,255 | 3/1963 | Stevens et al. | 260—570.5 |
| 3,225,096 | 12/1965 | Mills et al. | 260—570.5 |
| 3,254,124 | 5/1966 | Stevens | 260—570.5 |
| 3,340,305 | 9/1967 | Jahn | 260—570.5 X |

ROBERT V. HINES, Primary Examiner

U.S. Cl. X.R.

260—348, 570.6, 465.5, 566, 482, 561, 501.17, 253, 592; 424—330, 253

UNITED STATES PATENT OFFICE
CERTIFICATE OF CORRECTION

Patent No. 3,492,351   Dated January 27, 1970

Inventor(s) HERBERT KOPPE ET AL

It is certified that error appears in the above-identified patent and that said Letters Patent are hereby corrected as shown below:

Col. 2, Formula VII " $\begin{array}{c}R_5 \\ R\end{array}\!\!>\!\!X$ " should be -- $\begin{array}{c}R_5 \\ R_3\end{array}\!\!>\!\!X$ --

Col. 5, line 5    " (-omethoxy-" should be -- (-o-methoxy-

Col. 5, Example 5 formula    " $\begin{array}{c}-CH-CH_2 \\ | \\ NH-CH_2\end{array}$ " should be -- $\begin{array}{c}-CH-CH_2 \\ | \\ NH-CH_3\end{array}$ --

Col. 5, line 42    "isopropylamino" should be --isopropylami

Col. 6, line 49    "1-p-methoxy" should be -- 1-(p-methoxy -

Col. 7, line 17    "maner" should be -- manner --

SIGNED AND
SEALED
JUN 30 1970

(SEAL)
Attest:

Edward M. Fletcher, Jr.
Attesting Officer

WILLIAM E. SCHUYLER, JR.
Commissioner of Patents